United States Patent
Davidson

(10) Patent No.: US 12,413,082 B2
(45) Date of Patent: Sep. 9, 2025

(54) DC ENERGY STORAGE SYSTEM

(71) Applicant: General Electric Technology GmbH, Baden (CH)

(72) Inventor: Colin Davidson, Stafford (GB)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 178 days.

(21) Appl. No.: 18/295,742

(22) Filed: Apr. 4, 2023

(65) Prior Publication Data

US 2023/0344257 A1 Oct. 26, 2023

(30) Foreign Application Priority Data

Apr. 26, 2022 (EP) .................................... 22275050

(51) Int. Cl.
*H01M 50/383* (2021.01)
*H02J 7/00* (2006.01)
*H02M 7/483* (2007.01)

(52) U.S. Cl.
CPC ......... *H02J 7/0042* (2013.01); *H01M 50/383* (2021.01); *H02J 7/00309* (2020.01); *H02M 7/4835* (2021.05)

(58) Field of Classification Search
CPC ........ H02J 7/0042; H02J 7/00309; H02J 3/36; H02J 1/06; H02J 1/14; H01M 50/383; H02M 7/4835
See application file for complete search history.

(56) References Cited

U.S. PATENT DOCUMENTS

| | | | |
|---|---|---|---|
| 9,209,693 B2 | 12/2015 | Davidson et al. | |
| 10,790,738 B1 * | 9/2020 | Mhiesan | H02M 7/49 |
| 2009/0081963 A1 * | 3/2009 | Boren | H01Q 21/30 |
| | | | 455/90.1 |
| 2019/0068076 A1 | 2/2019 | Uda et al. | |
| 2019/0068081 A1 | 2/2019 | Trainer et al. | |

(Continued)

FOREIGN PATENT DOCUMENTS

| | | |
|---|---|---|
| DE | 10103031 B4 | 12/2011 |
| EP | 2849306 A1 | 3/2015 |

(Continued)

OTHER PUBLICATIONS

Extended European Search Report issued in EP Application No. 22275050.7 dated Oct. 17, 2022, 5 pages.

(Continued)

*Primary Examiner* — Daniel Cavallari
(74) *Attorney, Agent, or Firm* — Eversheds Sutherland (US) LLP

(57) ABSTRACT

A DC energy storage system may include first and second DC terminals for connection to a DC link, a DC energy storage converter including a number of modules connected in series between the first and second DC terminals, each module including at least one switching element and at least one battery, the or each switching element and the or each battery in each module being combinable to selectively provide a voltage source, and at least one fire-resistant protective barrier arranged to separate the modules into converter sections, each converter section including at least one module of the number of modules.

14 Claims, 4 Drawing Sheets

(56) References Cited

U.S. PATENT DOCUMENTS

2020/0091564 A1  3/2020  Moen et al.
2020/0262585 A1  8/2020  Dahl et al.
2020/0381927 A1  12/2020  Feng et al.
2021/0288591 A1  9/2021  Kuhn et al.
2023/0336067 A1* 10/2023  Nolan ................. H02M 7/4835

FOREIGN PATENT DOCUMENTS

EP       3001552 A1      3/2016
EP       3934011 A1      1/2022
WO     WO-2010102667 A1 *  9/2010  .............. H02M 7/49
WO       2021239620 A1   12/2021

OTHER PUBLICATIONS

Extended European Search Report issued in EP Application No. 22275051.5 dated Oct. 20, 2022, 6 pages.

* cited by examiner

DC ENERGY STORAGE SYSTEM

TECHNICAL FIELD

This invention relates to a DC energy storage system, preferably for use in high voltage direct current (HVDC) transmission and reactive power compensation.

BACKGROUND OF THE INVENTION

In HVDC power transmission networks AC power is typically converted to DC power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance. DC power is also transmitted directly from offshore wind parks to onshore AC power transmission networks. The conversion between DC power and AC power is utilised where it is necessary to interconnect DC and AC networks. In any such power transmission network, converters (i.e. power converters) are required at each interface between AC and DC power to affect the required conversion from AC to DC or from DC to AC.

SUMMARY OF THE INVENTION

According to an aspect of the invention, there is provided a DC energy storage system comprising:
  first and second DC terminals for connection to a DC link;
  a DC energy storage converter including a plurality of modules connected in series between the first and second DC terminals, each module including at least one switching element and at least one battery, the or each switching element and the or each battery in each module being combinable to selectively provide a voltage source; and
  at least one fire-resistant protective barrier arranged to separate the plurality of modules into converter sections, each converter section including at least one module of the plurality of modules.

The provision of the fire-resistant protective barriers to divide the modules into discrete converter sections enables continued safe operation of the DC energy storage system at reduced capacity in the event of a battery fire by ensuring that the fire does not adversely affect other converter sections and providing sufficient time for remedial and/or protective action to be taken in order to remove faulty modules from operation. Also, configuring the DC energy storage system as a stand-alone system connected to the DC link reduces the risk of a fire in the DC energy storage system spreading to other power equipment in the same electrical system or network.

On the other hand the omission of the fire-resistant protective barriers creates a risk of the entire DC energy storage system being destroyed in the event of just one battery catching fire.

In a preferred embodiment of the invention, each converter section includes multiple modules of the plurality of modules.

In embodiments of the invention, the DC energy storage system may include a controller programmed to selectively control the switching of the switching elements of the modules so as to regulate a charge level of each battery.

In further embodiments of the invention, each converter section may include a bypass element connected across the corresponding module or modules, each bypass element operable to selectively divert a current flowing through the corresponding converter section to bypass the corresponding module or modules. The bypass element may be a bypass switching element, such as a mechanical switching element, a disconnector or a circuit breaker.

The installation of the fire-resistant protective barriers in combination with the provision of the bypass elements enables continued safe operation of the DC energy storage system at reduced capacity in the event of a battery fire by ensuring that the fire does not adversely affect other converter sections and providing sufficient time for the bypass elements to bypass the modules affected by the fire and remove them from operation. Furthermore, the provision of the bypass element in each converter section provides a way of rapidly removing the modules from operation in comparison to other ways of removing the modules from operation.

The plurality of modules may be arranged in pre-assembled module devices. Each pre-assembled module device may include multiple modules of the plurality of modules and a local control unit programmed to control the switching of the switching elements of the modules in the same pre-assembled module device. Preferably each pre-assembled module device includes at least one local power supply device configured to supply power to the local control unit in the same pre-assembled module device. The or each local power supply device may be configured to source power from two or more of the batteries of the modules in the same pre-assembled module device. Each pre-assembled module device may include a local bypass element connected across the modules in the same pre-assembled module device, wherein the local bypass element may be operable to selectively divert a current flowing through the pre-assembled module device to bypass the corresponding modules. The local bypass element may be or may include a local bypass switching element, such as a mechanical switching element, a disconnector or a circuit breaker.

Arranging the modules in pre-assembled module devices not only allows a reduction in the overall number of components by configuring the modules in the same pre-assembled module device to share common components, e.g. a common bypass element or a common control unit, but also makes it more straightforward to design and install the fire-resistant protective barriers to separate the plurality of modules into converter sections, thus improving the fault tolerance of the DC energy storage system.

The DC energy storage system may include at least one inductor connected in series with the plurality of modules between the first and second DC terminals. The purpose of the inductors is to smooth the current flowing into or out of the DC energy storage converter.

The DC energy storage system may include: at least one pre-insertion resistor connected in series with the plurality of modules between the first and second DC terminals; and at least one shorting switching element operable to divert a current flowing between the first and second DC terminals to bypass the or each pre-insertion resistor. The purpose of the pre-insertion resistors is to permit gradual charging of the batteries when they are first connected to the DC link, and the pre-insertion resistors are shorted out by the shorting switching elements after the batteries are charged.

The configuration of each module may vary depending on the requirements of the application of the DC energy storage system.

Preferably, in each module, there is no intermediate DC-DC converter interfacing the or each battery with the or each switching element.

Each module may include a capacitor or may include a capacitor-inductor (L-C) filter.

Each module may include an isolation device that is activatable to electrically isolate the or each corresponding battery from the or each switching element of the same module. In such embodiments, the isolation device may include a fuse and/or a disconnector.

The or each fire-resistant protective barrier may be explosion-resistant.

In embodiments of the invention, the DC energy storage system may include a fire detector configured to detect a presence of a fire in the converter sections. The controller may be programmed to, responsive to detection of the presence of the fire in one or more of the converter sections by the fire detector, determine whether the number of healthy modules in the DC energy storage converter is sufficient or insufficient to continue operation of the DC energy storage system if one or more faulty modules is removed from operation. Depending on the number of healthy modules deemed to be sufficient or insufficient to continue operation of the DC energy storage system if the or each faulty module is removed from operation, the controller is then programmed to take one or more remedial and/or protective actions, non-limiting examples of which are described as follows and throughout the specification.

In a first example, the controller may be programmed to, responsive to a determination that the number of healthy modules in the DC energy storage converter is sufficient to continue operation of the DC energy storage system if one or more faulty modules is removed from operation, operate one or more of the bypass elements to divert a current flowing through the DC energy storage converter to bypass the or each faulty module. In addition, the controller may be programmed to, responsive to a determination that the number of healthy modules in the DC energy storage converter is sufficient to continue operation of the DC energy storage system if one or more faulty modules is removed from operation, increase a voltage output of the healthy modules to compensate for removal of the or each bypassed faulty module from operation.

In a second example, the controller may be programmed to, responsive to a determination that the number of healthy modules in the DC energy storage converter is insufficient to continue operation of the DC energy storage system if one or more faulty modules is removed from operation, provide a control signal to shut down an electrical system of which the DC link forms part or to electrically isolate the DC energy storage converter from the DC link.

There may be provided an electrical assembly comprising: a DC energy storage system according to any one of the embodiments of the invention; and a DC link, wherein the first and second DC terminals of the DC energy storage system may be connected to the DC link.

Each module in the DC energy storage system of the invention may vary in configuration, non-limiting examples of which are set out as follows.

In a first exemplary configuration of a module, the or each switching element and the or each battery in the module may be arranged to be combinable to selectively provide a unidirectional voltage source. For example, the module may include a pair of switching elements connected in parallel with a battery in a half-bridge arrangement to define a 2-quadrant unipolar module that can provide zero or positive voltage and can conduct current in two directions. In a second exemplary configuration of a module, the or each switching element and the or each battery in the module may be arranged to be combinable to selectively provide a bidirectional voltage source. For example, the module may include two pairs of switching elements connected in parallel with a battery in a full-bridge arrangement to define a 4-quadrant bipolar module that can provide negative, zero or positive voltage and can conduct current in two directions.

The plurality of modules may be connected in series to define a chain-link converter. The structure of the chain-link converter permits build-up of a combined voltage across the chain-link converter, which is higher than the voltage available from each of its individual modules, via the insertion of the batteries of multiple modules, each providing its own voltage, into the chain-link converter. In this manner switching of the or each switching element in each module causes the chain-link converter to provide a stepped variable voltage source, which permits the generation of a voltage waveform across the chain-link converter using a step-wise approximation. Hence the chain-link converter is capable of providing a wide range of complex voltage waveforms.

At least one switching element may be a wide-bandgap material based switching element or a silicon semiconductor based switching element. Examples of wide-bandgap materials include, but are not limited to, silicon carbide, boron nitride, gallium nitride and aluminium nitride. At least one switching element may include at least one self-commutated switching device. The or each self-commutated switching device may be an insulated gate bipolar transistor (IGBT), a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated switching device. The number of switching devices in each switching element may vary depending on the required voltage and current ratings of that switching element. At least one switching element may further include a passive current check element that is connected in anti-parallel with the or each switching device. The or each passive current check element may include at least one passive current check device. The or each passive current check device may be any device that is capable of limiting current flow in only one direction, e.g. a diode. The number of passive current check devices in each passive current check element may vary depending on the required voltage and current ratings of that passive current check element.

Each module may include a single battery or a plurality of batteries.

It will be appreciated that the use of the terms "first" and "second", and the like, in this patent specification is merely intended to help distinguish between similar features (e.g. the first and second DC terminals, etc.), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Preferred embodiments of the invention will now be described, by way of non-limiting examples, with reference to the accompanying drawings in which.

DETAILED DESCRIPTION

The figures are not necessarily to scale, and certain features and certain views of the figures may be shown exaggerated in scale or in schematic form in the interests of clarity and conciseness. The following embodiments of the invention are used primarily in HVDC applications, but it will be appreciated that the following embodiments of the invention are applicable mutatis mutandis to other applications operating at different voltage levels.

Figure 1:
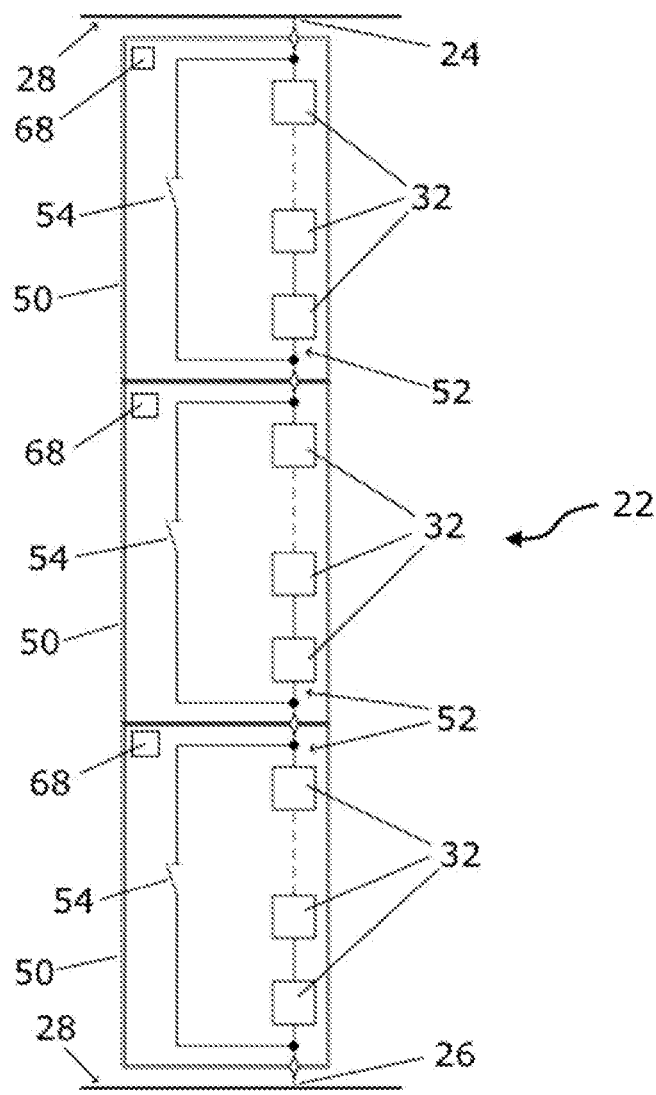
FIG. 1 shows a DC energy storage system according to an embodiment of the invention.
Figure 2:
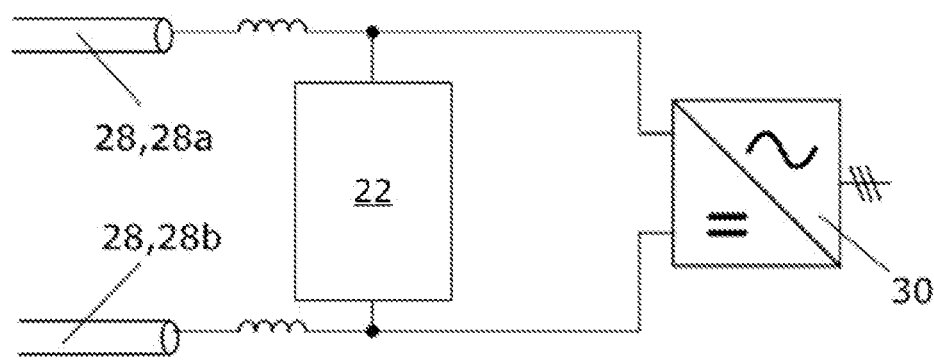
FIG. 2 shows an electrical assembly comprising the DC energy storage system of FIG. 1 and a DC link.
Figure 3:
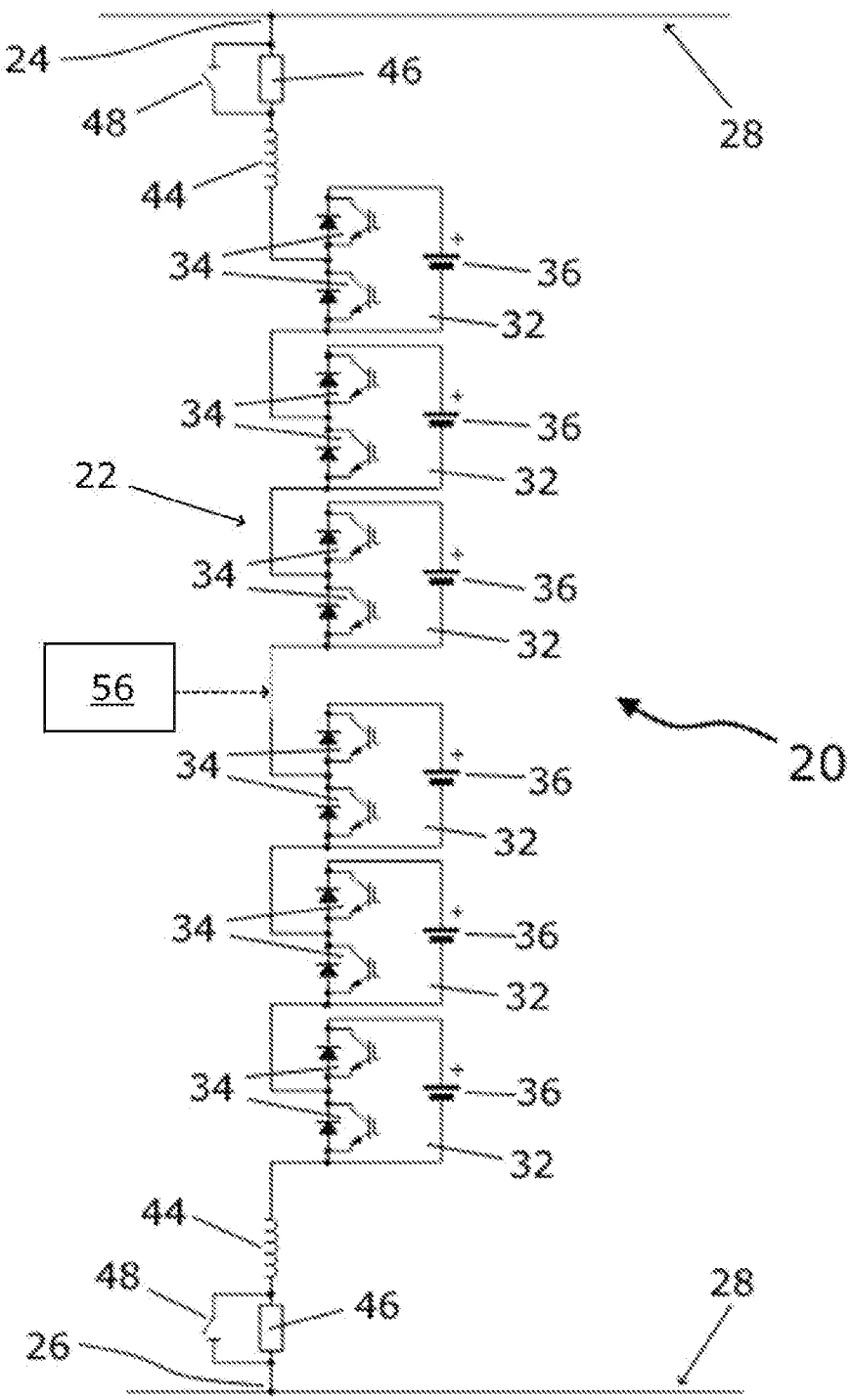
FIG. 3 shows an exemplary configuration of the DC energy storage system of FIG. 1.

A DC energy storage system according to an embodiment of the invention is shown in FIGS. 1 to 3 and is designated generally by the reference numeral 20. The DC energy storage system 20 comprises first and second DC terminals 24,26 and a DC energy storage converter 22 connected between the first and second DC terminals 24,26. The DC energy storage system 20 does not include any AC terminal that provides a direct connection to an AC potential, system or network. The first and second DC terminals 24,26 may respectively comprise: DC positive and negative terminals; a DC positive terminal and a DC ground terminal; or a DC ground terminal and a DC negative terminal. In use, the first and second DC terminals 24,26 are respectively directly connected to a DC link 28 to form an electrical assembly. The DC link 28 may comprise a pair of DC power transmission lines 28a,28b connected to a DC side of an AC-DC power converter 30, as shown in FIG. 2.

The DC energy storage converter 22 includes a plurality of modules 32 connected in series between the first and second DC terminals 24,26. The modules 32 together form a chain-link converter.

Each module 32 may vary in topology, non-limiting examples of which are described as follows.

Figure 4A:
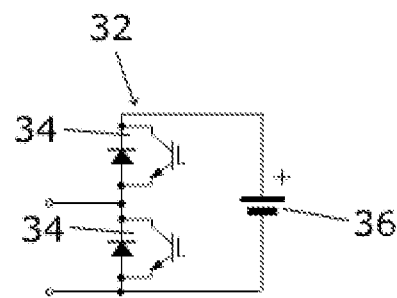
FIGS. 4a to 4d show various configurations of a given module of the DC energy storage system of FIG. 1.

FIG. 4a shows schematically the structure of an exemplary module 32 in the form of a half-bridge module 32a. The half-bridge module 32a includes a pair of switching elements 34 and a battery 36. Each switching element 34 of the half-bridge module 32a is in the form of an IGBT which is connected in parallel with an anti-parallel diode. The pair of switching elements 34 are connected in parallel with the battery 36 in a half-bridge arrangement to define a 2-quadrant unipolar module that can provide zero or positive voltage and can conduct current in both directions.

It is envisaged that, in other embodiments of the invention, each switching element 34 of each module 32 may be replaced by a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated semiconductor device. It is also envisaged that, in other embodiments of the invention, each switching element 34 may be replaced by a plurality of series-connected switching elements or a plurality of parallel-connected switching elements, and/or each diode may be replaced by a plurality of series-connected diodes or a plurality of parallel-connected diodes.

The battery 36 of each module 32 is selectively bypassed or inserted into the chain-link converter by changing the states of the switching elements 34. This selectively directs current through the battery 36 or causes current to bypass the battery 36, so that the module 32 provides a zero or non-zero voltage. The battery 36 of the module 32 is bypassed when the switching elements 34 in the module 32 are configured to form a short circuit between the two module terminals in the module 32, whereby the short circuit bypasses the battery 36. This causes current in the chain-link converter to pass through the short circuit and bypass the battery 36, and so the module 32 provides a zero voltage, i.e. the module 32 is configured in a bypassed mode and thereby switched out of circuit from the DC energy storage converter 22. The battery 36 of the module 32 is inserted into the chain-link converter when the switching elements 34 in the module 32 are configured to allow the current in the chain-link converter to flow into and out of the battery 36. The battery 36 then charges or discharges its stored energy so as to provide a non-zero voltage, i.e. the module is configured in a non-bypassed mode and thereby switched into circuit in the DC energy storage converter 22.

In this manner the switching elements 34 in each module 32 are switchable to control flow of current through the corresponding battery 36.

It is possible to build up a combined voltage across the chain-link converter, which is higher than the voltage available from each of its individual modules 32, via the insertion of the batteries 36 of multiple modules 32, each providing its own voltage, into the chain-link converter. In this manner switching of the switching elements 34 in each module 32 causes the chain-link converter to provide a stepped variable voltage source, which permits the generation of a voltage waveform across the chain-link converter using a step-wise approximation. Hence, the switching elements 34 are switchable to selectively permit and inhibit flow of current through the corresponding batteries 36 in order to control a voltage across the DC energy storage converter 22.

It is envisaged that, in other embodiments of the invention, each module 32 may be replaced by another type of module which includes at least one switching element and at least one battery device, the or each switching element and the or each battery in each such module arranged to be combinable to selectively provide a voltage source. It is also envisaged that each module 32 may include more than one battery.

The configuration of each module 32 may vary depending on the requirements of the application of the DC energy storage system 20.

Alternative configurations of each module 32 are envisaged, non-limiting examples of which are described as follows with reference to FIGS. 4b to 4d.

Figure 4B:
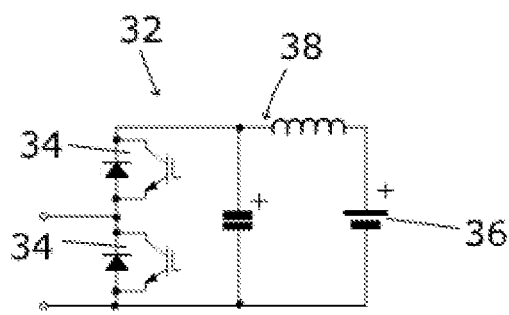
Figure 4C:
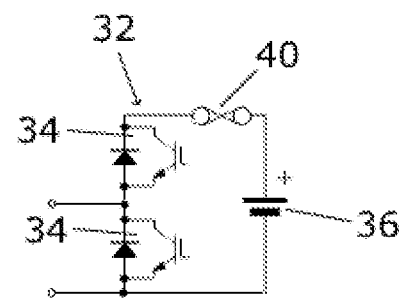
Figure 4D:
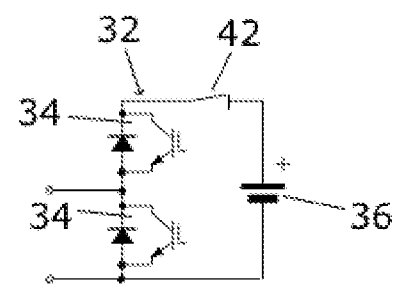

Each module 32 may include a capacitor or may include a capacitor-inductor (L-C) filter 38 connected in parallel with the battery 36, as shown in FIG. 4b. This would allow switching transients generated by the turn-on or turn-off of the switching elements 34 to be prevented from reaching the battery 36. The capacitor may have a capacitance in the microfarads range. Since the battery 36 has a much higher internal resistance than a typical plastic film capacitor, this would help to prevent the battery from overheating.

Each module 32 may include an isolation device connected in series with the battery 36. The isolation device is activatable to electrically isolate the battery from the rest of the module, which is beneficial in the event of a faulty battery. The isolation device may be a fuse 40 as shown in FIG. 4c, a disconnector 42 as shown in FIG. 4d or another type of electrical element capable of being operated to electrically isolate the battery. The isolation device may be manually or electrically operated.

It will be appreciated that it is not essential for all of the modules 32 to have the same module components and/or module structure. For example, the plurality of modules 32 may comprise a combination of modules having different module components and/or structures.

As shown in FIG. 3, the DC energy storage system includes two inductors 44 and two pre-insertion resistors 46 connected in series with the chain-link converter between the first and second DC terminals 24,26. A first of the inductors 44 and a first of the pre-insertion resistors 46 is connected in series between the first DC terminal 24 and the chain-link converter. A second of the inductors 44 and a second of the pre-insertion resistors 46 is connected in series between the second DC terminal 26 and the chain-link converter. Shorting switching elements 48, such as disconnectors or circuit breakers, are connected across the respective pre-insertion resistors 46 and are operable to divert a current flowing between the first and second DC terminals 24,26 to bypass the corresponding pre-insertion resistor 46.

The purpose of the inductors 44 is to smooth the current flowing into or out of the DC energy storage converter 22, preferably so that the current approximates a direct current. The purpose of the pre-insertion resistors 46 is to permit gradual charging of the batteries when they are first connected to the DC link 28, and the pre-insertion resistors 46 are shorted out by the shorting switching elements 48 after the batteries are charged.

Alternatively the DC energy storage system 20 may include only one of the inductors 44 and only one of the pre-insertion resistors 46. The inductors 44 and the pre-insertion resistors 46 are optional and therefore may be omitted from the DC energy storage system 20.

The DC energy storage system 20 further includes a plurality of fire-resistant protective barriers 50 that are arranged to separate the plurality of modules 32 into converter sections 52. Each converter section 52 includes multiple modules 32. In the embodiment shown, each converter section 52 is housed inside a respective dedicated building, and the fire-resistant protective barriers 50 are in the form of fire walls that surround the respective converter sections 52. Alternatively the fire walls 50 may be arranged to separate the converter sections 52 without surrounding the respective converter sections 52, e.g. a single fire wall between adjacent converter sections 52. The fire walls 50 would need to be rated to withstand the entire fire load (i.e. the potential severity of a fire within a specified space) of a converter section 52 without imposing an unacceptable temperature rise on the neighbouring converter section(s) 52. Preferably each fire-resistant protective barrier 50 is explosion-resistant so as to be capable of withstanding credible explosion events or hazards of the associated convertor sections 52 that might occur.

Each converter section 52 includes a bypass disconnector 54 connected across the corresponding modules 32. In the embodiment shown, the bypass disconnectors 54 are solenoid-operated or motor-operated but may be operated using different ways of opening and closing the disconnectors 54. In other embodiments, it is envisaged that each bypass disconnector 54 may be replaced by a different type of bypass element, such as a mechanical switching element or a circuit breaker. In use, each bypass disconnector 54 is opened to allow a current flowing through the corresponding converter section 52 to flow through the corresponding modules 32, and is closed to divert a current flowing through the corresponding converter section 52 to bypass the corresponding modules 32.

The DC energy storage system 20 further includes a controller 56 programmed to control the switching of the modules' switching elements 34, the bypass disconnectors 54 and the shorting switching elements 48. For the purposes of simplicity, the controller 56 is exemplarily described with reference to its implementation as a single control unit. In other embodiments, the controller 56 may be implemented as a plurality of control units. The configuration of the controller 56 may vary depending on specific requirements of the DC energy storage system 20. For example, the controller 56 may include a plurality of control units, each of which is configured to control the switching of the switching elements of a respective one of the modules 32. Each control unit may be configured to be internal to, or external of, the corresponding module 32. Alternatively, the controller 56 may include a combination of one or more control units internal to the corresponding module 32 and one or more control units external of the corresponding module 32. Each control unit may be configured to communicate with at least one other control unit, e.g., via telecommunications links.

Figure 5:
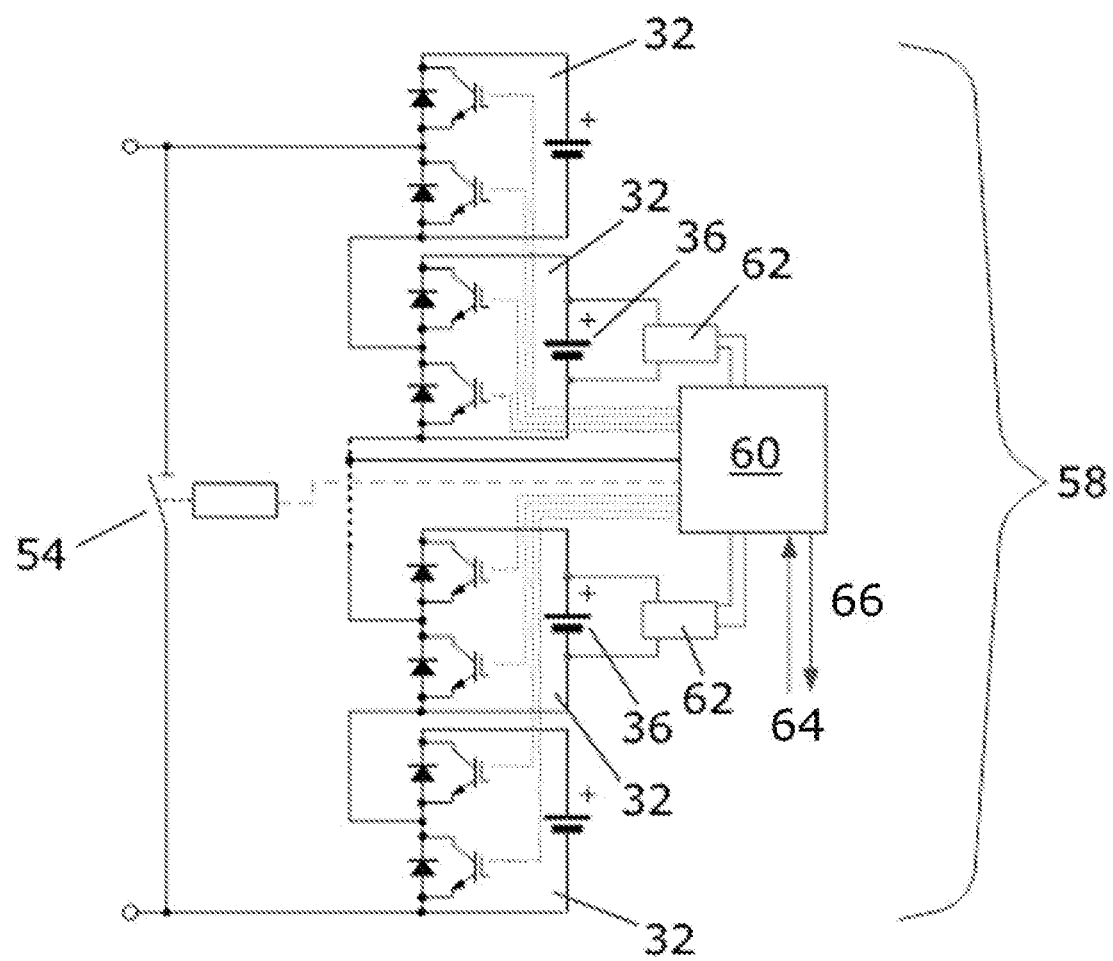
FIG. 5 shows a pre-assembled module device of the DC energy storage system of FIG. 1.

Exemplarily the plurality of modules 32 may be arranged in pre-assembled module devices 58, as shown in FIG. 5. The pre-assembled module devices' components are assembled in factories to form the pre-assembled module devices 58 that are then transported as assembled to the site of installation, as opposed to the pre-assembled module devices' components being transported in unassembled form and being assembled on-site. Each pre-assembled module device 58 includes multiple modules 32, a local bypass disconnector 54, a local control unit 60 and local power supply devices 62. The local control units 60 form part of the controller 56. The local bypass disconnector 54 is connected across the modules 32 in the same pre-assembled module device, and is operable to selectively divert a current flowing through the pre-assembled module device 58 to bypass the modules 32. The local control unit 60 is programmed to control the switching of the switching elements 34 of the modules 32 in the same pre-assembled module device 58, and is configured to communicate with a main control unit 64, e.g., via telecommunications links such as optical fibres 66. Each local power supply device 62 is configured to supply power to the local control unit 60 in the same pre-assembled module device 58 and to source power from two or more of the batteries 36 of the modules 32 in the same pre-assembled module device 58.

The purpose of the DC energy storage system 20 is to export power to the DC link 28 or import power from the DC link 28 to support the power transmission operation of the HVDC system of which the DC link 28 forms part. The charging and discharging of the DC energy storage system 20 as a whole is regulated by switching a controlled number of modules 32 into circuit in the DC energy storage converter 22 so as to produce a combined DC voltage that is either slightly higher than the terminal-to-terminal DC voltage of the DC link 28 to discharge the batteries and export power to the DC link 28 or slightly lower than the terminal-to-terminal DC voltage of the DC link 28 to charge the batteries and import power from the DC link 28.

The controller 56 controls the switching of the switching elements 34 of the modules 32 to selectively switch the modules 32 into and out of circuit between the DC terminals 24,26 in order to regulate a charge level of each battery 36. Preferably the charge levels of the batteries 36 are kept balanced, or as close to being balanced as possible, by cycling the switching of the modules 32 into circuit in the DC energy storage converter 22, e.g. by inserting the modules 32 with batteries 36 with above average voltages (or preferably the highest voltages) when the DC energy storage system 20 as a whole is discharging, and by inserting the modules 32 with batteries 36 with below average voltages (or preferably the lowest voltages) when the DC energy storage system 20 as a whole is charging.

The direct connection of the DC energy storage converter 22 to the DC link 28, with no connection to an AC potential, means that the current flowing in the DC energy storage converter 22 is only associated with the charging or discharging of the batteries 36 and can therefore be significantly lower than currents flowing in AC-DC converters 30 at the two ends of the DC link 28. The lower operating current thereby enables a simpler battery-based module design in comparison to conventional modules, thus leading to cost savings.

Furthermore, configuring the DC energy storage system 20 to be completely separate from the AC-DC converters 30 is beneficial in terms of fault tolerance and permits the DC energy storage system 20 to be operated independently of the AC-DC converters 30. For example, if the DC energy storage system 20 is out of action, power can still be transmitted along the DC link 28 between the AC-DC converters 30, while if one of the AC-DC converters 30 is out of action but the DC energy storage system 20 is available, the DC energy storage system 20 can still exchange power with the other AC-DC converter 30 and also other AC-DC converters in the associated HVDC system. Moreover, the DC energy storage system 20 can be located anywhere along the DC link 28 and is not required to be located in a converter station.

Safety measures for the DC energy storage system 20 must take into consideration the safety of personnel (e.g. maintenance technicians) and the mitigation of fire risks. As explained below, the invention enables integration of energy storage capability into the HVDC system in a cost-effective and safe way by mitigating against the risk of a battery fire destroying the entire DC energy storage system 20 and by allowing the continued operation of the entire DC energy storage system 20 (at reduced capacity) in the event of one or more converter sections 52 being completely destroyed by fire or explosion.

The installation of the fire-resistant protective barriers 50 to divide the modules 32 into discrete converter sections 52 in combination with the provision of bypass disconnectors 54 to enable bypass of faulty modules 32 enables continued safe operation of the DC energy storage system 20 at reduced capacity in the event of a battery fire by ensuring that the fire does not adversely affect other converter sections 52 and providing sufficient time for the bypass disconnector(s) 54 to bypass the modules 32 affected by the fire and remove them from operation. Furthermore, the separation of the DC energy storage system 20 from the AC-DC converters 30 further reduces the risk of a fire in the DC energy storage system 20 spreading to the AC-DC converters 30, which otherwise would have put in jeopardy a strategic transmission asset with the ability to transmit several GW of power.

Before closing the bypass disconnector 54 of one or more converter sections 52 to bypass the corresponding modules 32, it is necessary to check whether the combined output voltage of all available modules 32 in the remaining converter sections 52 is at least equal to the terminal-to-terminal DC voltage of the DC link 28 so as to permit continued operation of the DC energy storage system 20. If this criterion is not met, the entire DC energy storage system 20 would need to be removed from service.

A non-limiting way of checking whether the above criterion is met is described as follows.

The DC energy storage system 20 includes a fire detector configured to detect a presence of a fire in the converter sections 52. The fire detector may comprise a plurality of fire sensors 68, each of which is configured to detect the presence of a fire in a respective one of the converter sections 52. The fire sensors 68 may be conventional smoke/flame/arc sensors, and may be mounted on the walls of the building, mounted on or in the vicinity of each module 32 or a combination thereof.

When a fire is detected in one or more of the converter sections 52 by the corresponding fire sensor(s) 68, the controller then determines whether the number of healthy modules 32 in the DC energy storage converter 22 is sufficient or insufficient to continue operation of the DC energy storage system 20 at reduced capacity if faulty modules 32 are removed from operation. In this case, the modules 32 in the converter section(s) 52 affected by the fire are deemed to be faulty. The fire-resistant protective barriers 50 prevent the spread of the fire to the other converter sections 52 and also prevents an unacceptable temperature rise from being imposed on the neighbouring converter section(s) 52.

The controller 56 then controls the modules 32 of the converter section(s) 52 affected by the fire to provide a low enough voltage output to enable the controller 56 to safely close the bypass disconnector(s) 54 of the converter section (s) 52 affected by the fire to divert a current flowing through the DC energy storage converter 22 to bypass the faulty modules 32, without resulting in an excessive short-circuit current. Meanwhile the controller 56 controls the healthy modules 32 of the other converter sections 52 so as to increase a voltage output of the healthy modules 32 to compensate for removal of the bypassed faulty modules 32 from operation. The faulty modules 32 are then removed from operation by closing the corresponding bypass disconnector(s) 54.

Alternatively or additionally to the fire sensors 68, each module 32 may include at least one local sensor to detect a fault within that module 32. Upon detection of a fault by the or each local sensor, a signal is sent from the or each local sensor to the controller 56 to close the corresponding bypass disconnector(s) 54. The or each local sensor may be a voltage sensor, a current sensor, a temperature sensor or a sensor capable of estimating a state-of-charge of the battery 36.

If the number of healthy modules 32 is deemed to be insufficient to continue operation of the DC energy storage system 20 at reduced capacity if the faulty modules 32 are removed from operation, the controller 56 then provides a control signal to shut down the HVDC system or to electrically isolate the DC energy storage converter 22 from the DC link 28 using switchgear.

In order to provide a DC voltage compatible with the high voltage levels of HVDC power systems, a large number of batteries 36 are required, which in turn would require a large number of switching elements 34 and control units 60.

To reduce the overall number and cost of components, the plurality of modules 32 are preferably arranged in pre-assembled module devices 58, the configuration of which is described hereinabove. The modules 32 of each pre-assembled module device 58 preferably has a combined rated voltage in the range 2 kV to 10 kV. Using a single local control unit 60 to coordinate the switching of the switching elements 34 of the modules 32 in the same pre-assembled module device 58 reduces the overall number of control units 60 in the DC energy storage system 20. Furthermore, since the local control unit 60 is supplied with power from two or more batteries 36, the failure of one battery 36 would not deprive the pre-assembled module device 58 of the ability to close the local bypass disconnector 54, thus improving the fault tolerance of the DC energy storage system 20. Moreover, if there is a less serious fault with one or more batteries 36, the or each corresponding module 32 may be configured in its bypassed mode in order to allow the pre-assembled module device 58 to continue operation with a reduced output voltage. Finally, arranging the modules 32 in pre-assembled module devices 58 makes it more straightforward to design and install the fire-resistant protective barriers 50 to separate the plurality of modules 32 into converter sections 52.

It will be understood that it is optional for the modules to be arranged in pre-assembled module devices.

The listing or discussion of an apparently prior-published document or apparently prior-published information in this specification should not necessarily be taken as an acknowledgement that the document or information is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

I claim:

1. A DC energy storage system, comprising:
   first and second DC terminals for connection to a DC link;
   a DC energy storage converter including a plurality of modules connected in series between the first and second DC terminals, each module including at least one switching element and at least one battery, the or each switching element and the or each battery in each module being combinable to selectively provide a voltage source;
   at least one fire-resistant protective barrier arranged to separate the plurality of modules into converter sections, each converter section including at least one module of the plurality of modules; and
   a fire detector configured to detect a presence of a fire in the converter sections, wherein a controller is programmed to, responsive to detection of the presence of the fire in one or more of the converter sections by the fire detector, determine whether the number of healthy modules in the DC energy storage converter is sufficient or insufficient to continue operation of the DC energy storage system if one or more faulty modules is removed from operation.

2. A DC energy storage system according to claim 1, wherein each converter section comprises multiple modules of the plurality of modules.

3. A DC energy storage system according to claim 1, wherein the controller is programmed to selectively control the switching of the switching elements of the modules so as to regulate a charge level of each battery.

4. A DC energy storage system according to claim 1, wherein each converter section comprises a bypass element connected across the corresponding module or modules, each bypass element operable to selectively divert a current flowing through the corresponding converter section to bypass the corresponding module or modules.

5. A DC energy storage system according to claim 1, wherein the plurality of modules are arranged in pre-assembled module devices, each pre-assembled module device comprising multiple modules of the plurality of modules and a local control unit programmed to control the switching of the switching elements of the modules in the same pre-assembled module device.

6. A DC energy storage system according to claim 5, wherein each preassembled module device comprises at least one local power supply device configured to supply power to the local control unit in the same pre-assembled module device, and the or each local power supply device is configured to source power from two or more of the batteries of the modules in the same pre-assembled module device.

7. A DC energy storage system according to claim 1, wherein each module comprises a capacitor or includes a capacitor-inductor filter.

8. A DC energy storage system according to claim 1, wherein each module comprises an isolation device that is activatable to electrically isolate the or each corresponding battery from the or each switching element of the same module.

9. A DC energy storage system according to claim 8, wherein the isolation device comprises at least one of a fuse and a disconnector.

10. A DC energy storage system according to claim 1, wherein the or each fire-resistant protective barrier is explosion-resistant.

11. A DC energy storage system according to claim 4, wherein the controller is programmed to, responsive to a determination that the number of healthy modules in the DC energy storage converter is sufficient to continue operation of the DC energy storage system if one or more faulty modules is removed from operation, operate one or more of the bypass elements to divert a current flowing through the DC energy storage converter to bypass the or each faulty module.

12. A DC energy storage system according to claim 11, wherein the controller is programmed to, responsive to a determination that the number of healthy modules in the DC energy storage converter is sufficient to continue operation of the DC energy storage system if one or more faulty modules is removed from operation, increase a voltage output of the healthy modules to compensate for removal of the or each bypassed faulty module from operation.

13. A DC energy storage system according to claim 1, wherein the controller is programmed to, responsive to a determination that the number of healthy modules in the DC energy storage converter is insufficient to continue operation of the DC energy storage system if one or more faulty modules is removed from operation, provide a control signal to shut down an electrical system of which the DC link forms part or to electrically isolate the DC energy storage converter from the DC link.

14. An electrical assembly, comprising: a DC energy storage system according to claim 1; and a DC link, wherein the first and second DC terminals of the DC energy storage system is connected to the DC link.

\* \* \* \* \*